(No Model.)  2 Sheets—Sheet 1.

T. A. EDISON.
SYSTEM OF ELECTRICAL DISTRIBUTION.

No. 343,017.  Patented June 1, 1886.

ATTEST:
E. H. Rowland
A. W. Kiddle

INVENTOR:
Thomas A. Edison,
By Rich'd N. Dyer
Atty.

(No Model.) 2 Sheets—Sheet 2.
T. A. EDISON.
SYSTEM OF ELECTRICAL DISTRIBUTION.
No. 343,017. Patented June 1, 1886.
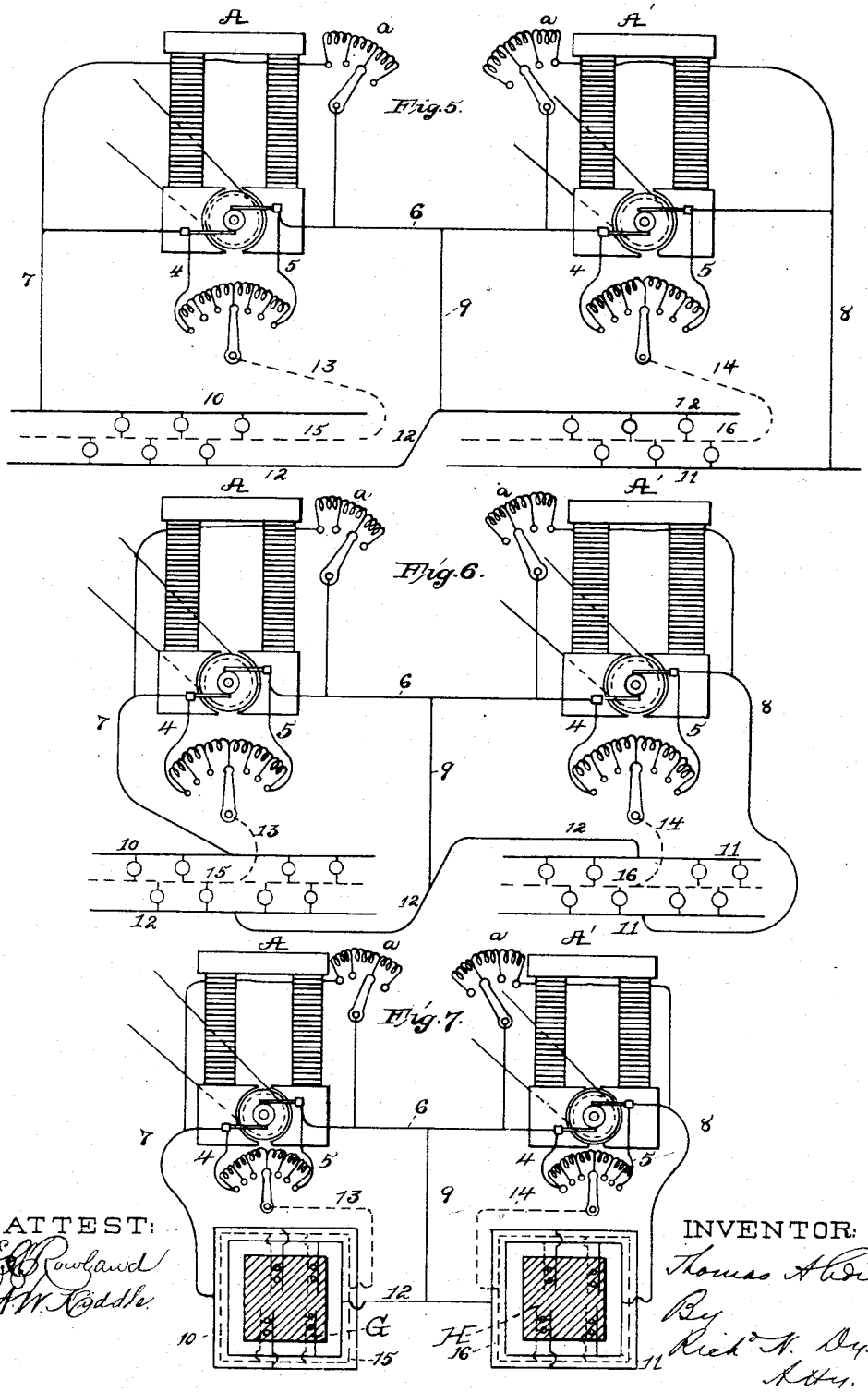
ATTEST:
E. B. Rowland
H. W. Riddle
INVENTOR:
Thomas A. Edison
By
Rich'd N. Dyer
Atty.

UNITED STATES PATENT OFFICE.

THOMAS A. EDISON, OF MENLO PARK, NEW JERSEY.

SYSTEM OF ELECTRICAL DISTRIBUTION.

SPECIFICATION forming part of Letters Patent No. 343,017, dated June 1, 1886.

Application filed August 7, 1884. Serial No. 139,962. (No model.)

*To all whom it may concern:*

Be it known that I, THOMAS A. EDISON, of Menlo Park, in the county of Middlesex and State of New Jersey, have invented a certain new and useful Improvement in Systems of Electrical Distribution, (Case 629,) of which the following is a specification.

The invention relates to compensating systems of electrical distribution wherein a divided source of electrical energy is employed, from which extend two main conductors and one or more intermediate compensating-conductors, as set forth in my Patent No. 274,290.

The object I have in view is to reduce the number of dynamos necessary for such a system, and this I do by dividing the electromotive force and current of a dynamo external to the same by means of resistances or their equivalents for this purpose—small motors or dynamos.

The invention is especially applicable to small and extended installations where it is desirable to use currents of high tension and four or more divisions of the system, although it is also useful in a compensating system of two divisions.

The invention consists in the method and apparatus employed for carrying this system into effect, broadly, and in some details hereinafter pointed out, and also in a special arrangement of the conductors of a compensating system having four or more divisions.

Figure 1:
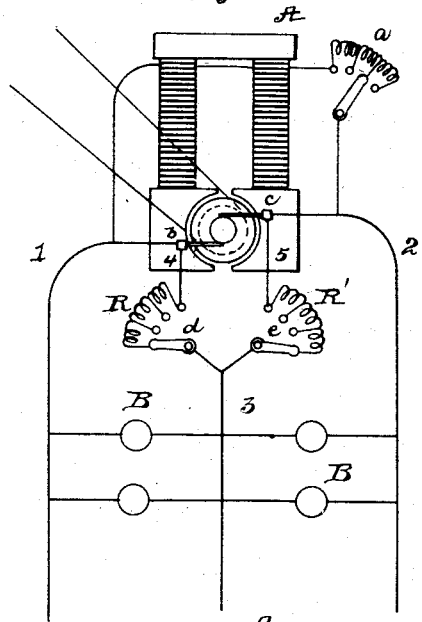
Figure 2:
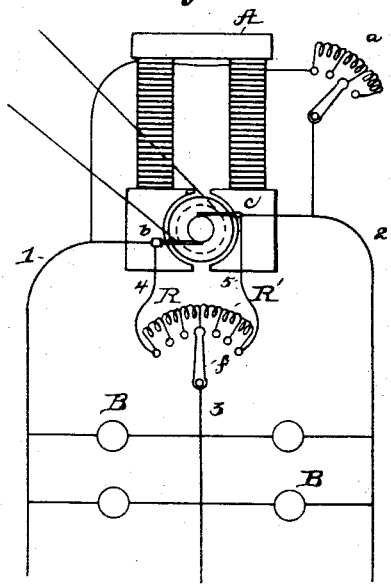
Figure 3:
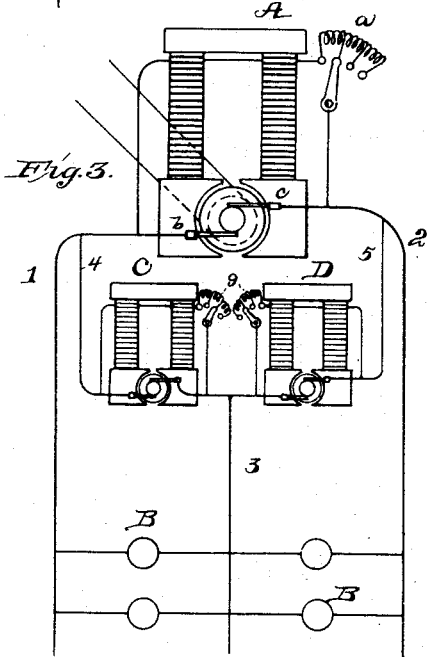
Figure 4:
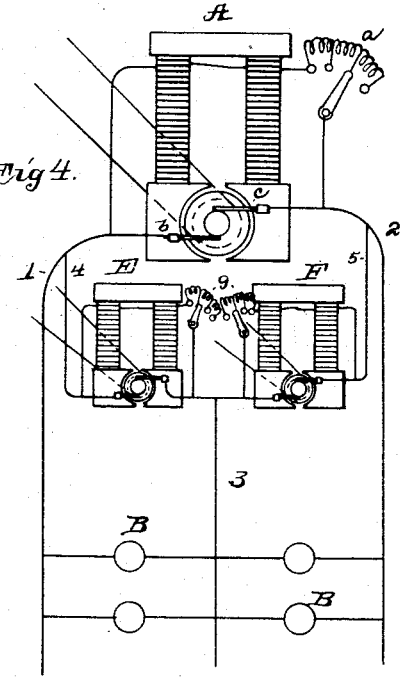

In the accompanying drawings, forming a part hereof, Figure 1 is a view, principally in diagram, showing the division of the electromotive force and current of a dynamo by means of resistances; Fig. 2, a similar view showing a different arrangement of the resistances; Fig. 3, a similar view illustrating the accomplishment of the division by means of small motors; Fig. 4, a similar view with small dynamos substituted for the motors; Fig. 5, a view, principally in diagram, of a system of four divisions; Fig. 6, a similar view showing a somewhat different arrangement of the conductors; and Fig. 7 a view, principally in diagram, illustrating the application of the system to a town.

With reference to Figs. 1 to 4, inclusive, A is a dynamo-electric machine having means for varying its generative capacity, which is preferably an adjustable resistance, $a$, in its field-circuit. From the commutator-brushes $b\ c$ of A extend main conductors 1 2, between which and a compensating-conductor, 3, are arranged in multiple-arc incandescing electric lamps or other translating devices, B. The brushes $b\ c$ are connected externally to the machine by a bridge or shunt circuit, 4 5, to the central portion of which is connected the compensating-conductor 3. The bridge-circuit 4 5 contains resistances R R', Figs. 1 and 2, located one on each side of the connection of the compensating-conductor therewith. These are preferably adjustable independently by contact-arms $d\ e$, as shown in Fig. 1, although the compensating-conductor 3 may be connected to a single contact-arm, $f$, Fig. 2, which increases one resistance as it decreases the other. This adjustment or variation of the forces of the two sides of the bridge-circuit with relation to each other is used to bring the two divisions of the system into balance. The total electro-motive force is varied by adjusting the strength of the field-magnet of dynamo A.

In my patent referred to is shown and described means for taking the three conductors of a compensating system from one dynamo, such means being a third commutator-brush; but practical considerations make that method undesirable, it having objections which are overcome by the external bridge-circuit.

Instead of the adjustable resistances R R', small electro-dynamic motors C D, Fig. 3, or small auxiliary dynamo-electric machines E F, Fig. 4, may be used in the two sides of the bridge-circuit 4 5. The counter or direct forces of the motors or generators can be varied independently in any suitable way. Adjustable resistances $g$ in the field-magnet circuits are shown for this purpose. This system of dividing the electro-motive force and current of a dynamo by an external bridge-circuit has especial advantages in a compensating system of four or more divisions.

A system with four divisions is shown in Figs. 5, 6, and 7. Two dynamos, A A', are connected in series by conductor 6, and have main conductors 7 8 extending from their outside brushes, and a compensating-conductor, 9, extending from conductor 6 between the dynamos. These are feeders running to the centers or ends of main conductors 10 11 12. Each machine A A' has an independent field-circuit with an adjustable resistance, $a$, for varying the generative capacity of the machine. Each machine also has a bridge-circuit, 4 5, and conductors 13 14 extend from the centers of these bridge-circuits to mains 15 16. Conductors 13 14 are also feeders, and each of these, as well as each of the feeders 7, 8, and 9, may be in one part running to a suitable point upon the mains, or in two or more parts connected at different points to the mains to equalize the distribution of current.

As shown in Figs. 5, 6, and 7, the system is composed of two compensating systems or sections each of two divisions, the two sections being connected in series by conductor 12.

I prefer to divide a town or locality to be supplied with current into two sections, and in each to run three mains, from which the house-circuits will be taken. The conductors of the two sections are connected in series, and proper feeders run from the station thereto.

In Fig. 7 the squares G H represent two sections of a town or locality with conductors arranged in this manner.

What I claim is—

1. The combination, with a dynamo-electric machine, of a bridge-circuit connecting its commutator-brushes externally to the machine, conductors extending from the ends and center of such bridge-circuit, and translating devices arranged in multiple arc in the circuits thus formed, substantially as set forth.

2. The combination, with a dynamo-electric machine, of a bridge-circuit connecting its commutator-brushes externally to the machine, conductors extending from the ends and center of the bridge-circuit, such bridge-circuit being arranged for varying the relative forces existing on opposite sides of such central connection, and translating devices arranged in multiple arc in the circuits thus formed, substantially as set forth.

3. The combination, with a dynamo-electric machine, of a bridge-circuit connecting its commutator-brushes externally to the machine, conductors extending from the ends and center of the bridge-circuit, such bridge-circuit being arranged for an independent and separate adjustment of the forces existing on opposite sides of such central connection, and translating devices arranged in multiple arc in the circuits thus formed, substantially as set forth.

4. In a system of electrical distribution, the combination with two or more dynamo-electric machines connected in series, a bridge-circuit across the brushes of each machine, and conductors extending from the ends and centers of such bridge-circuits to translating devices, substantially as set forth.

5. In a system of electrical distribution, the combination, with two or more dynamo-electric machines connected in series, each being adapted for independent regulation or adjustment of its generative capacity, a bridge-circuit across the brushes of each machine, and conductors extending from the ends and centers of such bridge-circuits to translating devices, each bridge-circuit being arranged for varying the relative forces existing on opposite sides of the central connection therewith, substantially as set forth.

6. A compensating system of electrical distribution of four or more divisions, having one dynamo-electric machine for every two divisions, the current and electro-motive force of each machine being divided between the two divisions, substantially as set forth.

7. A compensating system of electrical distribution of four or more divisions, divided into sections of two divisions each, such sections being connected in series, substantially as set forth.

8. In a compensating system of electrical distribution of four or more divisions, a town or locality divided into two or more sections, each containing conductors for two divisions, such sections being connected in series, substantially as set forth.

This specification signed and witnessed this 27th day of June, 1884.

THOS. A. EDISON.

Witnesses:
 ALFRED W. KIDDLE,
 BENJAMIN F. CARD.